United States Patent [19]

Miyano et al.

[11] Patent Number: 4,987,522
[45] Date of Patent: Jan. 22, 1991

[54] ILLUMINATION DEVICE AND ROOF MEMBER FOR A FORKLIFT

[75] Inventors: Takayuki Miyano; Shinsuke Nii, both of Kariya, Japan

[73] Assignee: Kabushiki Kaisha Toyoda Jidoshokki Seisakusho, Kariya, Japan

[21] Appl. No.: 452,557

[22] Filed: Dec. 18, 1989

[30] Foreign Application Priority Data

Dec. 21, 1988 [JP] Japan .............................. 63-164450
Dec. 23, 1988 [JP] Japan .............................. 63-165766

[51] Int. Cl.⁵ .............................................. B60Q 1/02
[52] U.S. Cl. .................................... 362/74; 362/396; 414/914; 280/756; 296/213
[58] Field of Search ................. 362/61, 80, 234, 253, 362/370, 396, 74; 414/529, 914; 280/756; 296/213

[56] References Cited

U.S. PATENT DOCUMENTS

| | | | |
|---|---|---|---|
| 3,954,150 | 5/1976 | Cole et al. | 280/756 X |
| 4,079,985 | 3/1978 | Martin | 414/914 X |
| 4,332,415 | 6/1982 | Williams | 296/213 |
| 4,515,393 | 5/1985 | Sauter | 362/61 X |

Primary Examiner—Stephen F. Husar
Attorney, Agent, or Firm—Brooks Haidt Haffner & Delahunty

[57] ABSTRACT

The present invention relates to a roof member and illumination device mountable to a ceiling portion of a head guard in a forklift without interfering with each other. The illumination device has a 'C' shaped light mounting bracket, and the roof member has an upward facing depression formed in one portion of the peripheral drip edge groove so that the roof member can be inserted in between the upper and lower portion of the light mounting bracket. Also, the roof member has a window portion provided for upper observation, this window portion bulging upwards to improve water drainage.

7 Claims, 5 Drawing Sheets

ILLUMINATION DEVICE AND ROOF MEMBER FOR A FORKLIFT

BACKGROUND OF THE INVENTION

1. Field of the Invention

The present invention is related to forklifts with attached headguards, particularly to illumination devices and roof members that can be mounted to a ceiling portion of such a headguard.

2. Background Art

The mounting of vinyl sheets or flat metal sheeting on the ceiling portions of headguards attached to a forklift has conventionally been a general practice to keep out the sun or rain (See Japanese U.M. Application Laid Open Nos. 58-93519 & 59-69014).

However, rain water can easily accumulate on vinyl sheets and since there are no lips or drip edges this accumulated rain water can drop on the front and rear portions of the driver's seat during acceleration or braking to interfere with operation. On the other hand, although it is more difficult for rain to collect on flat metal sheeting in comparison with vinyl sheet, similar to vinyl sheets there is still the defect in that no means are provided to guide the rain water to a rain gutter of the headguard, allowing the rain water to fall on the driver's seat during acceleration and braking. Also, both vinyl sheet and flat metal sheeting obstruct the upper field of view hindering cargo handling operations.

Now, in recent years resin panels having a clear window portion in the front area and drip edges around the periphery are being used as a roof member. This type of roof member can efficiently guide the rain water on the upper surface through the drip edge provided on the periphery thereof to the rain guttering on the headguard. Also, as a window portion is provided a driver can further confirm operation because of his view above the head guard. However, there is a problem with this type of roof member in that water does not drain well because the window portion is essentially level with the other remaining portions. For this reason, it is easy for the window portion to fog up and further, even though a drip edge is provided, water collected on the roof can still overflow the drip edge and fall on the driver's seat when accelerating or braking.

In the meantime, for nighttime operation of forklifts, it is a general practice to fix a light on a crosspiece of the ceiling portion of the headguard with an appropriate fixture However, when flat metal sheeting, vinyl sheet or a roof member with drip edges are mounted to the ceiling portion of a head guard as mentioned above, the light and roof member interfere with each other with conventional light mounting fixtures and the mounting position of the roof member must be shifted. With such a shift, the rain protection function of the roof member is not fully exhibited.

In response to this problem, it is conceivable to mount the light so that it juts out from the front of the frame, but such a method cannot be utilized because there is a fear of the light being struck by the mast when the mast is tilted back.

SUMMARY OF THE INVENTION

Consequently, the object of the present invention is to provide a combination of an illumination device and a roof member with drip edges that can be mounted at a desired position on a ceiling portion of a headguard, without the above problems occurring.

Another object of the present invention is to provide a roof member that can efficiently lead rain water on the upper surface thereof to peripheral drip edging.

Another further object of the present invention is to provide an illumination device that can be mounted to a ceiling portion of a headguard without the need to shift a roof member such as of flat metal sheeting, vinyl sheet, etc.

In order to achieve the above objects, the present invention is characterized in the combination of the illumination device and roof member as shown below: the illumination device comprising a light mounting bracket bent into a figure 'C' an end of a lower portion being removably fixable to crosspieces of said ceiling portion and a light mounted to an end of an upper portion of said light mounting bracket, the illumination device capable of being arranged at a position where the bent portion of said light mounting bracket is along an outermost edge of said ceiling portion; the roof member comprising a drip edge groove formed at a periphery thereof, an upward facing depression formed in a lower part of one portion of said periphery so that the periphery of the roof member can be inserted in between said upper and lower portions of the light mounting bracket of said illumination device when the illumination device is mounted at a fixed position of said ceiling portion, and a mounting means for removably mounting the roof member to the ceiling portion.

The above illumination device is also capable of being used with roof members such as of flat metal sheeting, vinyl sheets, etc., as they may also be inserted between the upper and lower portions of the mounting bracket.

In an even further embodiment of the present invention, the roof member has a clear, bulging window portion in a front portion thereof. With this window portion, not only is the upper field of view ensured, but the water drainage off the upper surface of the roof member is improved because of the bulging shape, so that the window portion can be maintained in a clear state for a long period of time.

Further, a plurality of grooves connecting with the rear drip edge grooves may be formed behind the window portion, further improving water drainage. Such grooves also improve the strength of the roof member and, as a result, the roof member can be subject to further thinning or lightening.

Other objects and features of the present invention will become apparent from the following detailed explanation in conjunction with the attached drawings.

BRIEF DESCRIPTION OF THE DRAWINGS

In the course of the following detailed description, reference will be made to the attached drawings in which.

DETAILED DESCRIPTION OF PREFERRED EMBODIMENTS

Figure 1:
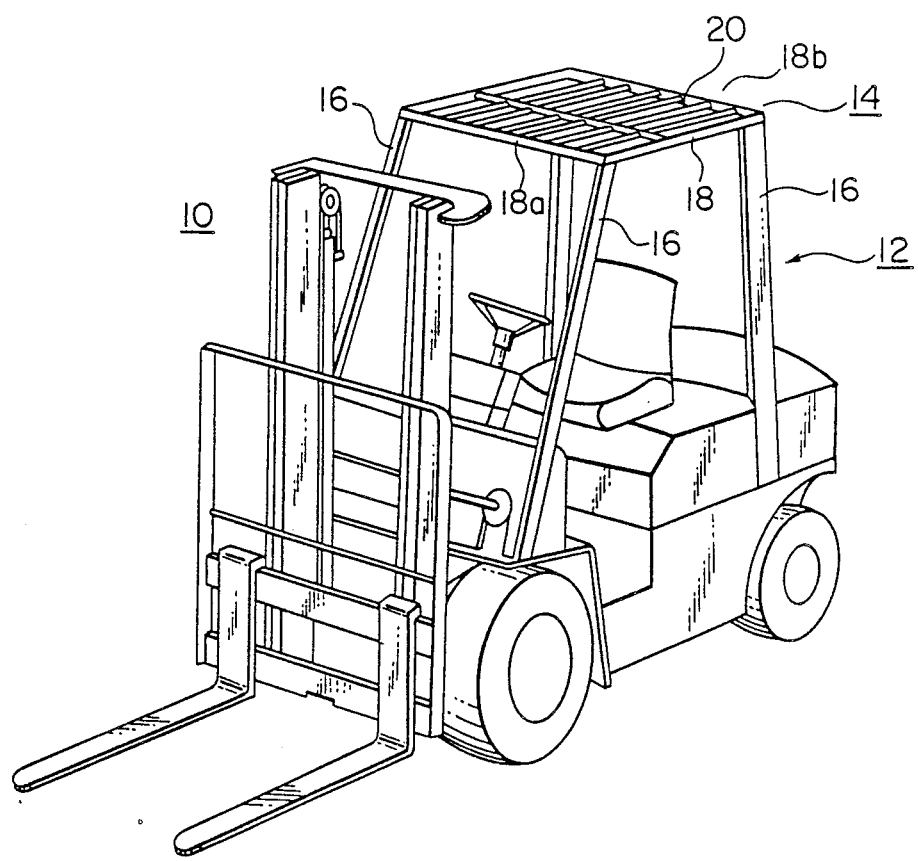
FIG. 1 is a perspective view of a typical forklift for which the present invention may be applied.

In FIG. 1 a typical forklift in which the present invention may be applied is shown, the forklift being collectively labeled 10. A ceiling portion 14 of head guard 12 of the forklift 10 is comprised from frame 18 attached to respective upper ends of head guard pillars 16 and crosspieces 20 forming a grid inside the frame 18, the frame members 18a, 18b being of a rain guttering configuration (Refer to FIG. 2).

Figure 2:
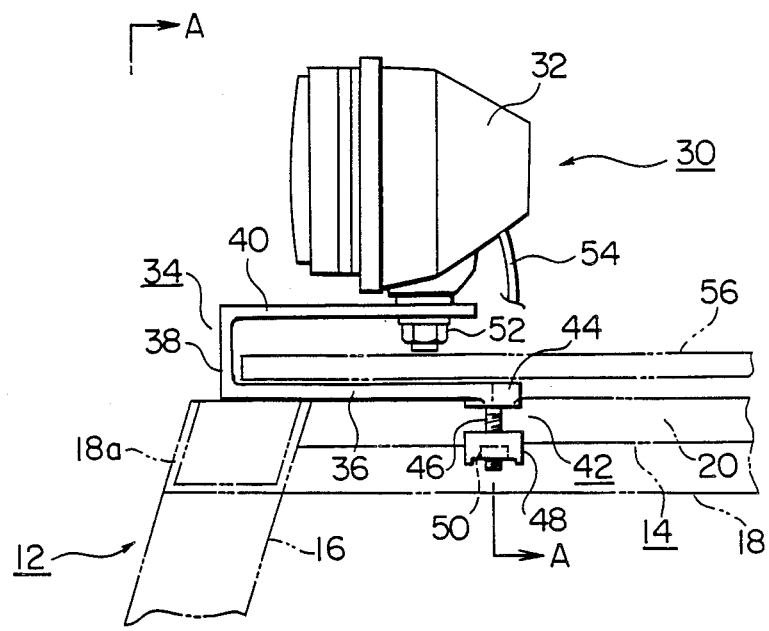
FIG. 2 is a side elevational view of one embodiment of the illumination device of the present invention.
Figure 3:
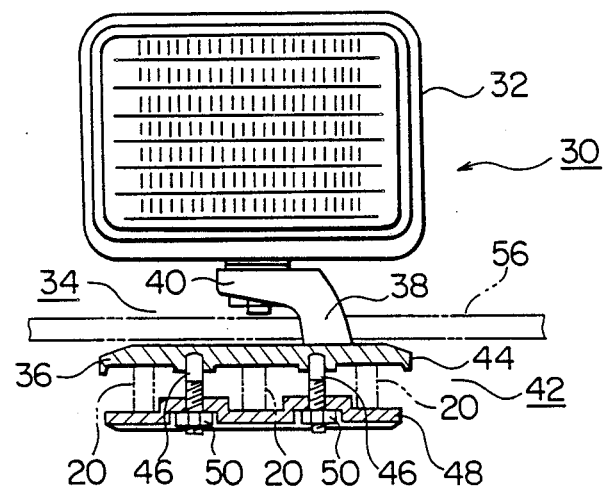
FIG. 3 is a sectional view of the illumination device taken along the line A—A in FIG. 2.

FIGS. 2 & 3 show an illumination device in accordance with the present invention, the illumination device being collectively labeled 30. This illumination device 30 is comprised so as to mount a light 32 on the ceiling portion 14 of head guard 12 of the forklift 10 through a light mounting bracket of a 'C' shape. The bracket 34 of illumination device 30 is comprised from a horizontally extending lower portion 36, a bent portion 38 bending at one end of lower portion 36 to extend upwards, and an upper portion 40 at an upper end of bent portion 38 and bending again to extend parallel with lower portion 36. At the free end of lower portion 36 is provided a fixing means 42 for fixing bracket 34 to ceiling portion 14. Although many types of fixing means 42 are conceivable, in this embodiment it is comprised of the free end of lower portion 36 of bracket 34 in the form of a T-shaped end 44, a pair of stud bolts 46 fixed in a downward position from end 44 and appropriately spaced from each other, a clamp plate 48 for holding crosspieces 20 of ceiling portion 14 between said T-shaped end 44 said clamp plate having apertures for passing said stud bolts 46, and nuts 50 for threadably engaging stud bolts 46.

Further, light 32 is fixed at the free end of upper portion 40 of bracket 34 by a nut 52. Although the light 32 shown in the drawings is a unidirectional wide beam type halogen lamp, other types such as revolving lamps may also be used. Wiring 54 from light 32 is connected to a battery on the vehicle and a switch on the instrument panel at the driver's seat, although this is not shown in the drawings.

When such an illumination device 30 is mounted to the ceiling portion 14 of head guard 12, the T-shaped end 44 of lower portion 36 of the bracket 34 is first laid across prescribed crosspieces 20 of the from the upper surface of ceiling portion 14, the clamp plate 48 is arranged at the lower surface of the crosspieces 20 so that the stud bolts 46 pass through the apertures in the plate 48, and subsequently the nuts 50 are threaded to the stud bolts 46 mounting the device 30. The point to be kept in mind here is to make sure the bracket 34 is mounted so that the bent portion 38 is at a position along the outer periphery of the ceiling portion 14. Furthermore, although only illumination device 30 is shown mounted to the front of ceiling portion 14 in the drawings, the mounting position is not limited thereto and may also be at the sides or rear, with no requirement to limit the number of devices to one.

When an illumination device 30 is mounted to ceiling portion 14 in such a manner, a roof member 56 such as of flat metal sheeting may be inserted into the gap between the upper portion 40 and lower portion 36 of bracket 34, so that the roof member 56 can be arranged at a prescribed position on ceiling portion 14 without being obstructed by illumination device 30.

Figure 4:
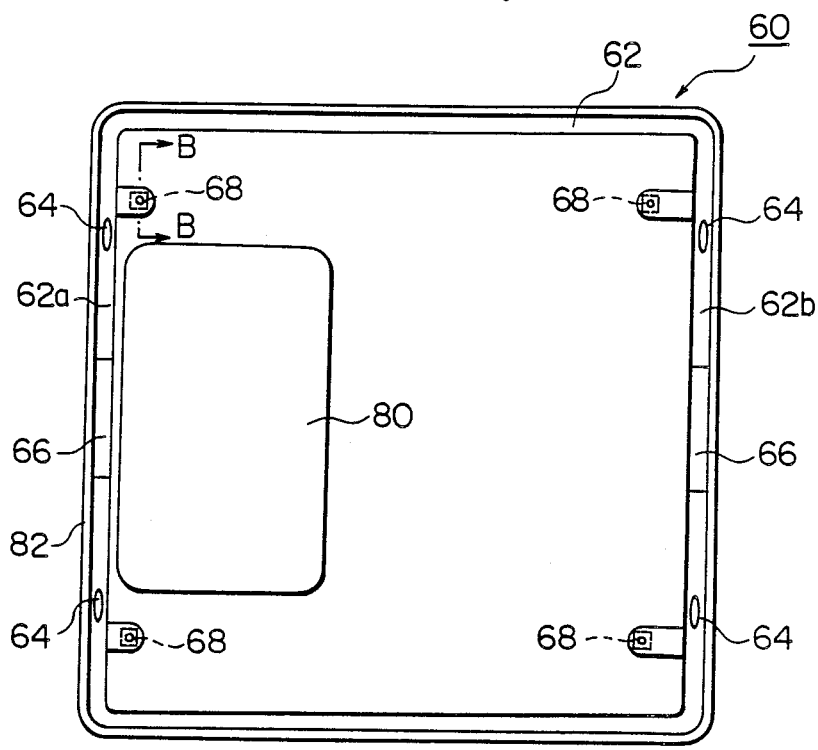
FIG. 4 is a plan view of one embodiment of roof member according to the present invention which can be used in conjunction with the illumination device of FIGS. 2 & 4.

However, the periphery of a roof member with drip edging formed at the periphery in order to improve top surface water drainage, is naturally of a thicker material and therefore the roof member cannot be inserted between the upper and lower portions of the illumination device bracket described above. To solve this problem there is an embodiment of the present invention shown in FIGS. 4 to 6 of a roof member with drip edging that can be used with said illumination device.

A roof member 60 is formed by pressing and the like of an appropriate vinyl chloride resin and has an area approximately identical with that of the ceiling portion 14 of the head guard to which it is to be mounted. Also, drip edging groove 62 is formed along the periphery of roof member 60 so that if the roof member 60 is properly mounted to head guard 12, the front and rear drip edging grooves 62a, 62b will be positioned directly above the drip edge configured front and rear frame members 18a, 18b respectively (See FIG. 6). Small apertures 64 are disposed in the front and rear drip edge grooves 62a, 62b so that water in those grooves will be drained by passing through the apertures 34 to the drip edge grooves in the frame 18. Although not shown in the drawings, the water drained into the grooves is drained outside the vehicle by passing through a hose in the head guard pillar 16.

Figure 5:
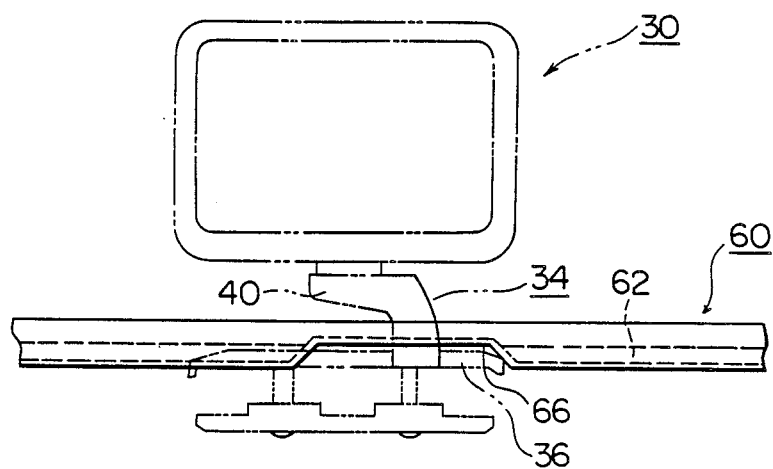
FIG. 5 is a front view showing a portion of the roof member of FIG. 4.
Figure 6:
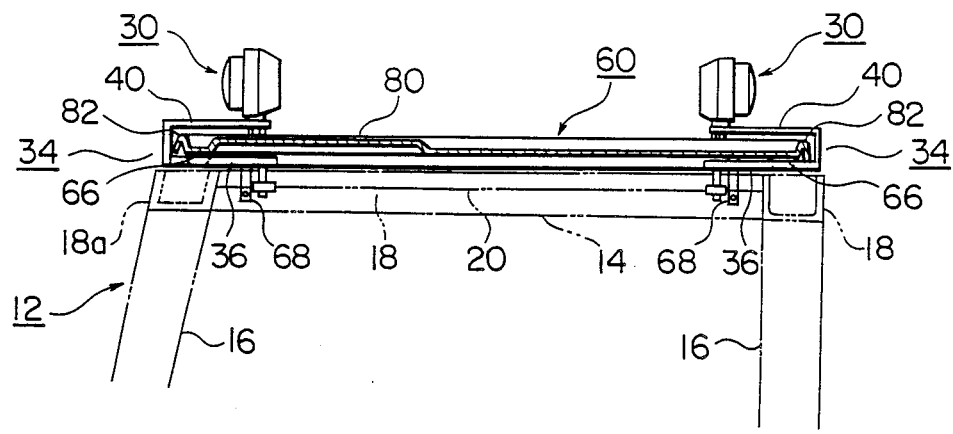
FIG. 6 is a sectional view in a front to rear direction of the roof member, showing a mode of employment with the illumination device of FIGS. 2 & 3.

In this roof member 60, an upward facing depression 66 is formed at appropriate positions in the periphery thereof, for example in the front central and rear central lower portions, as clearly shown in FIG. 5, the lower surfaces of depressions 66 being generally in the same plane as the lower central flat area of roof member 60.

With such a roof member 60, if illumination devices 30 as shown in FIGS. 2 and 3 mounted to the front and rear central areas of the ceiling portion 14 of head guard 12, the depression 66 of roof member 60 can be disposed between the upper portion 36 and lower portion 40 of each bracket 34, and accordingly roof member 60 can be mounted in a prescribed position of ceiling portion 14, that is a position that covers all of ceiling portion 14, without interfering with the illumination devices 30. In the illustrated embodiment, the position of the depression 66 is set at the front and rear central areas of roof member 60, but it should be apparent that other positions are possible as they are dependent on the mounting positions of the illumination devices.

Figure 7:
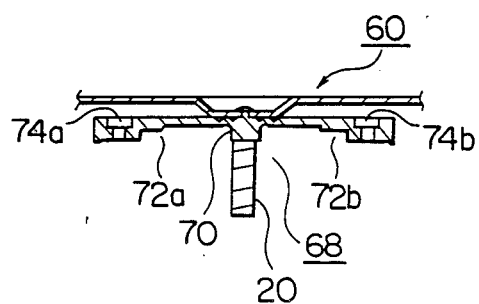
FIGS. 7 & 8 are sectional views taken along B—B of FIG. 4 of the mounting fixtures, FIG. 7 showing before mounting of the roof member and FIG. 8 after mounting.
Figure 8:
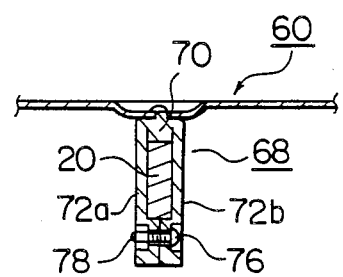

On the underside of roof member 60 mounting fixtures 68 for removably mounting the roof member 60 to the ceiling portion 14 of head guard 12 are provided at four places. Even though known means such as belts or clips may be used as the mounting fixtures 68, in the present embodiment, as illustrated in FIGS. 7 and 8, a mounting fixture 68 is utilized comprised from a support base 70 fixed to the underside of roof member 60 and roof brackets 72a, 72b that are bendable and extend from both sides of base 70. When a roof member 60 is mounted using such mounting fixtures 68, each support base 70 is first set on the prescribed crosspiece 20, both roof brackets 72a, 72b are closed around a crosspiece 20, and then a bolt 76 passed through through-holes 74a, 74b in the ends of the brackets is simply tightened with a nut 78.

Further, the front portion of the roof member 60 has a clear window portion 80 disposed therein, with the remaining portions being coated to ward off the sun. The window portion 80 is comparatively higher than the other portions (except for the rising edge 82 on the circumference of roof member 60). For this reason rain water will quickly move to the surrounding areas without standing at the window portion 80, and then efficiently led to the drip edge grooves 62. Accordingly, clouding of the window portion 80 due to standing rain water will be reduced.

Figure 9:
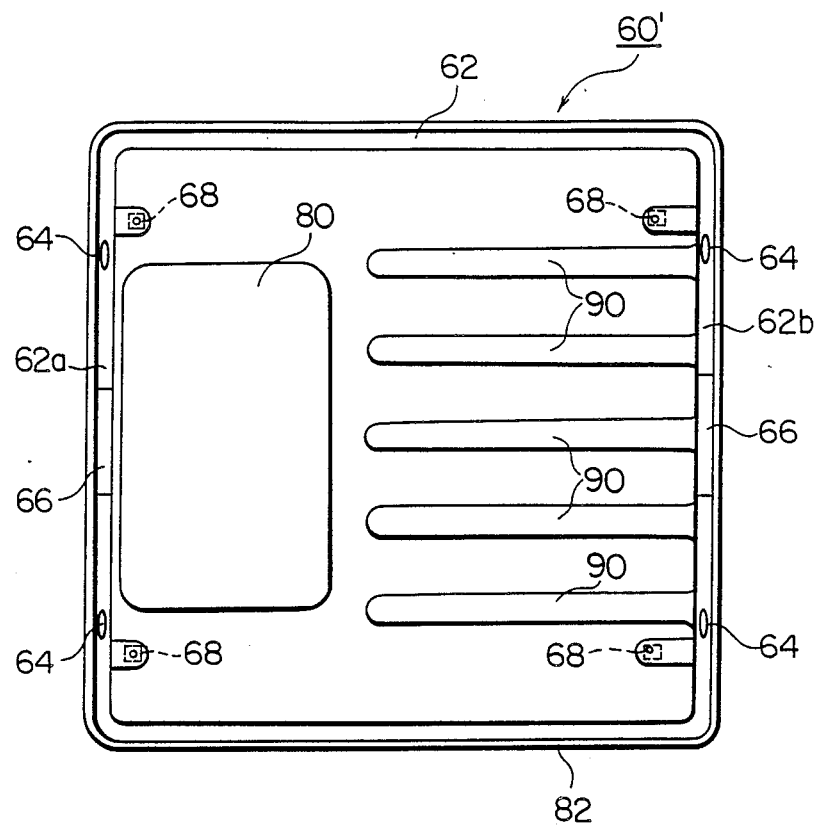
FIG. 9 is a plan view of another embodiment of the roof member of the present invention.

In FIG. 9 another embodiment of roof member 60' according to the present invention is shown. Roof member 60' in this embodiment is identical to that in the first embodiment shown in FIGS. 4-6 except for the point of having a number of grooves 90 at the portion behind the window portion 80, and identical portions are labeled with identical reference numerals. The number of grooves 90 formed behind window portion 80, extend to the rear with the end portions thereof communicating with the rain gutter of frame member 18b. These grooves 90 not only act to lead rain water that tends to stand at the central portion of the roof member to the rain gutter 18b, but also serve to improve the strength of roof member 60', particularly torsional strength.

Roof members 60, 60' such as mentioned above, may of course be used independently without an illumination device 30. It may be easily understood that when they are used in such a fashion it is not necessary to provide the depressions at the periphery of the roof member.

It goes without saying that many configurations of the present invention are possible. For example, glass may be used for the window portion of the roof member and the remaining portions may be of sheet metal. Consequently, the variations existing within the true spirit and scope of the present invention are all included within the following claims.

What is claimed is:

1. A combination of an illumination device and a roof member mountable to a ceiling portion of a fork lift, characterized in that the illumination device comprises a light mounting bracket bent into a figure 'C', an end of a lower portion being removably fixable to a crosspiece of said ceiling portion and a light mounted to an end of an upper portion of said light mounting bracket, the illumination device capable of being arranged at a position where the bent portion of said light mounting bracket is along an outermost edge of said ceiling portion; and the roof member comprises a drip edge groove formed at a periphery thereof, an upward facing depression formed in a lower part of one portion of said periphery so that the periphery of the roof member can be inserted in between said upper and lower portions of the light mounting bracket of said illumination device when the illumination device is mounted at a fixed position of said ceiling portion, and a mounting means for removably mounting the roof member to the ceiling portion.

2. The combination of claim 1 wherein the roof member has a clear window portion in a front portion thereof, said window being higher than other portions of the roof member.

3. The combination of claim 2 wherein a plurality of grooves connecting with the rear drip edge groove are provided behind the window portion.

4. The combination of claim 1 wherein said mounting means is provided with a support base fixed to the underside of the roof member, roof brackets that are bendable and extend from both sides of said base, said roof brackets able to close around a crosspiece of the ceiling portion when they are bent, and a securing means for securing both ends of said roof brackets to each other.

5. An illumination device mountable to a ceiling portion of a fork lift, characterized in that the illumination device comprises a light mounting bracket bent into a figure 'C', an end of a lower portion being removably fixable to a crosspiece of said ceiling portion and a light mounted to an end of an upper portion of said light mounting bracket, the illumination device capable of being arranged at a position where the bent portion of said light mounting bracket is along an outermost edge of said ceiling portion.

6. A roof member mountable to a ceiling portion of a fork lift, characterized in that the roof member comprises a drip edge groove formed at a periphery thereof, a clear window portion in a front portion thereof, said window being higher than other portions of the roof member, a plurality of groove provided behind the window portion and connecting with the rear drip edge groove and a mounting means for removably mounting the roof member to the ceiling portion.

7. The roof member of claim 6 wherein said mounting means is provided with a support base fixed to the underside of the roof member, roof brackets that are bendable and extend from both sides of said base, said roof brackets able to close around a crosspiece of the ceiling portion when they are bent, and a securing means for securing both ends of said roof brackets to each other.

* * * * *